(12) United States Patent
Hoffman (10) Patent No.: US 12,125,411 B1
(45) Date of Patent: Oct. 22, 2024

(54) EVALUATING RESPONSES TO OPEN-ENDED QUESTIONS

(71) Applicant: Wells Fargo Bank, N.A., San Francisco, CA (US)

(72) Inventor: Jason Scott Hoffman, Urbandale, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/054,481

(22) Filed: Nov. 10, 2022

(51) Int. Cl.
*G09B 7/04* (2006.01)
*G06N 20/00* (2019.01)

(52) U.S. Cl.
CPC ............... *G09B 7/04* (2013.01); *G06N 20/00* (2019.01)

(58) Field of Classification Search
CPC .................................. G09B 7/04; G06N 20/00
See application file for complete search history.

(56) References Cited

U.S. PATENT DOCUMENTS

| | | | |
|---|---|---|---|
| 4,958,284 A | 9/1990 | Bishop et al. | |
| 2012/0064501 A1 | 3/2012 | Sukkarieh | |

OTHER PUBLICATIONS

Ahmed et al., "Evaluation of descriptive answers of open ended questions using NLP techniques", IEEE, 2021 4th International Conference on Computing & Information Sciences (ICCIS), Nov. 29, 2021, 7 pp.

Cinar et al., "Machine learning algorithm for grading open-ended physics questions in Turkish", vol. 25, No. 5, Education and Information Technologies, Mar. 2, 2020, p. 3821-3844.

Merchant, "Semantic Similarity with BERT", Aug. 15, 2020, 10 pp.

Mohler et al., "Learning to Grade Short Answer Questions using Semantic Similarity Measures and Dependency Graph Alignments", Proceedings of the 49th Annual Meeting of the Association for Computational Linguistics, Jun. 19, 2011, p. 752-762.

Sychev et al., "Automatic grading and hinting in open-ended text questions", vol. 59, Cognitive Systems Research, Jan. 2020, pp. 264-272.

*Primary Examiner* — Kesha Frisby
(74) *Attorney, Agent, or Firm* — Shumaker & Sieffert, P.A.

(57) ABSTRACT

Techniques described herein involve testing the knowledge of a learner by evaluating a response to an open-ended question that prompts a learner to provide a short answer. In one example, this disclosure describes a method that includes receiving, by a computing system, a learner question and a model answer to the learner question; outputting, by the computing system, the learner question; responsive to outputting the learner question, receiving, by the computing system, a learner answer; performing, by the computing system, an entailment assessment based on the model answer and the learner answer; determining, by the computing system and based on the entailment assessment, an evaluation of the learner answer; outputting, by the computing system, information about the evaluation; and controlling, by the computing system, a downstream computing system based on the information about the evaluation.

20 Claims, 5 Drawing Sheets

EVALUATING RESPONSES TO OPEN-ENDED QUESTIONS

TECHNICAL FIELD

This disclosure relates to computing systems, and more specifically, to learning management systems.

BACKGROUND

There are a number of traditional and common ways to test the knowledge of a student or other learner, with test question types ranging from objective to subjective. For example, objective response tests typically test knowledge using multiple choice questions, true/false questions, matching questions, or questions requiring a learner to categorize, match, or sort topics. Subjective response tests include those that require learners to respond in the form of an explanation. Questions in a subjective response test can include essay questions, short answer questions, definition prompts, and other subjective response questions. Often, subjective response questions will test a learner's knowledge more deeply than objective response questions.

SUMMARY

Techniques described herein involve testing the knowledge of a learner by evaluating an answer to an open-ended question that prompts a learner to provide a response. In some examples, techniques described herein evaluate short responses from a learner (e.g., a single sentence or phrase), rather an essay response that may encompass several sentences. Using shorter responses may enable more effective use of artificial intelligence models that are capable of evaluating sentences for textual "entailment," which is a concept that is useful when evaluating short learner answers to open-ended test questions. Techniques described herein also involve evaluating a learner's knowledge using a "model answer" chosen by an instructional designer, and refining and making improvements to a computing system used to perform such an evaluation.

In some examples, this disclosure describes operations performed by a computing system or learning management system in accordance with one or more aspects of this disclosure. In one specific example, this disclosure describes a method comprising receiving, by a computing system, a learner question and a model answer to the learner question; outputting, by the computing system, the learner question; responsive to outputting the learner question, receiving, by the computing system, a learner answer; performing, by the computing system, an entailment assessment based on the model answer and the learner answer; determining, by the computing system and based on the entailment assessment, an evaluation of the learner answer; outputting, by the computing system, information about the evaluation; and controlling, by the computing system, a downstream computing system based on the information about the evaluation.

In another example, this disclosure describes a system comprising a storage system and processing circuitry having access to the storage system, wherein the processing circuitry is configured to carry out operations described herein.

In yet another example, this disclosure describes a computer-readable storage medium comprising instructions that, when executed, configure processing circuitry of a computing system to carry out operations described herein.

The details of one or more examples of the disclosure are set forth in the accompanying drawings and the description below. Other features, objects, and advantages of the disclosure will be apparent from the description and drawings, and from the claims.

DETAILED DESCRIPTION

An instructional designer ("ID") is a person that designs educational materials and/or curricula used to teach students or other learners. Instructional designers strive to implement learning materials that produce greater learning outcomes for students. Assessing those outcomes often involves developing a testing process and a range of questions to be presented to learners in order to test and/or evaluate the learner's knowledge of a specific topic. The questions may include objective response questions, subjective response questions, or a mix of both.

One advantage of a test that uses objective response questions, such as multiple-choice questions, is automation. Evaluating learner answers and arriving at a score can be performed easily by a machine or a computing device. Yet with objective response questions, a learner's score might not accurately reflect that learner's level of knowledge about the subject matter being tested. For example, learners often are not penalized for attempting to guess the correct answer in a multiple-choice test, and inevitably, a learner will sometimes be able to select the correct answer choice without actually possessing the knowledge being tested. In addition, some learners may be skilled in identifying incorrect or "distractor" responses in multiple choice tests, and those learners will tend to have better scores than other similarly knowledgeable learners that are less skilled in identifying incorrect responses. Accordingly, a learner's score on a multiple-choice test will not always align with that learner's actual knowledge of the subject matter being tested.

Also, when designing questions for an objective response test, instructional designers attempt to address these shortcomings of objective response questions by creating questions and distractor answers that are not readily susceptible to guessing strategies. But successfully designing objective response that do not have these shortcomings is difficult. As a result, effectively designing objective response questions can be time-consuming and expensive.

Subjective response tests are much less susceptible to guessing strategies, and subjective response tests also tend to test knowledge more deeply than an objective response test. A test format that requires a learner to express, in that learner's own words, knowledge about a particular topic may provide more insight into that learner's level of knowledge and the extent to which the learner has effectively learned and/or internalized the information being tested. In general, a learner's answer expressed in his or her own words—even if a short phrase or sentence—will often reveal more about the learner's understanding of the subject matter than a response to an objective response question.

Accordingly, there are advantages to testing knowledge using a more subjective approach. One problem with a more subjective approach, however, is the difficulty of automating evaluation of learner responses. In general, evaluating answers to subjective response questions often requires the assistance of a human evaluator, which usually means that the evaluation process is time-consuming, inefficient, and expensive.

Attempts have been made to develop a process for automating the evaluation of responses to some subjective response questions, such as essay questions. However, these attempts generally have not been effective, because such prior approaches generally do not actually evaluate either the concepts presented in a learner's essay response or the logic of the argument expressed in the learner's essay response. In some cases, prior approaches have evaluated essay responses primarily by focusing on the containment of key and stop words (e.g., words relevant to the topic being tested) in a learner's answer and overall length of the learner's essay response. As a result, prior approaches to evaluating learners' essay responses have been shown to be susceptible to manipulation, since responses that merely include a significant number of key words that are relevant to the topic being tested may be evaluated favorably (i.e., indicating that the learner has internalized knowledge of the topic being tested). In some cases, an essay response might be evaluated favorably even when that response is simply a relatively random series of key words or phrases that a human evaluator would conclude was incoherent.

Techniques described herein involve testing the knowledge of a learner by evaluating a response to an open-ended question that requires a learner to provide a short answer. In at least some examples, rather than evaluating a full essay response, techniques described herein involve evaluating shorter responses, such as sentences or phrases. Using shorter responses enables effective use of artificial intelligence models that are capable of evaluating sentences for textual "entailment," which is a concept that turns out to be useful when evaluating, in an educational context, short learner answers to open-ended test questions. In linguistics, entailment is generally considered to be present between two sentences when the truth of one sentence requires the truth of another sentence. For example, the sentence "the prime minister was assassinated" entails the sentence "the prime minister is dead."

As described herein, an entailment model can be used to efficiently evaluate whether a sentence representing a learner answer to an open-ended question can be considered a "correct" response to the open-ended question. Effectively, the concept of textual entailment can be "turned on its head" to evaluate short plain-text answers (sentences or phrases) to open-ended questions, which creates an opportunity to test knowledge automatically in testing scenarios that previously would have required human evaluation. As further described herein, an instruction designer may, when designing a knowledge test, create both an open-ended question and a corresponding "correct" or "model" answer to the open-ended question. A computing device presents to the learner the open-ended question created by the instructional designer. In response to being prompted with the open-ended question, the learner provides an answer (e.g., through the computing device) in the form of a short sentence or phrase. Typically, the user's response is based on the learner's own understanding or recollection of a learning experience (e.g., a lecture, a set of learning materials, an apprenticeship, or practice or experience). An abstraction interface to an entailment model then presents two sentences to the model: (1) the learner's answer to the open-ended question, and (2) the instructional designer's "correct" or "model" answer to that same question. Based on whether the entailment model determines the presence of entailment between the two sentences, then learner's answer is evaluated as either a "correct" or "incorrect" response.

Figure 1A:
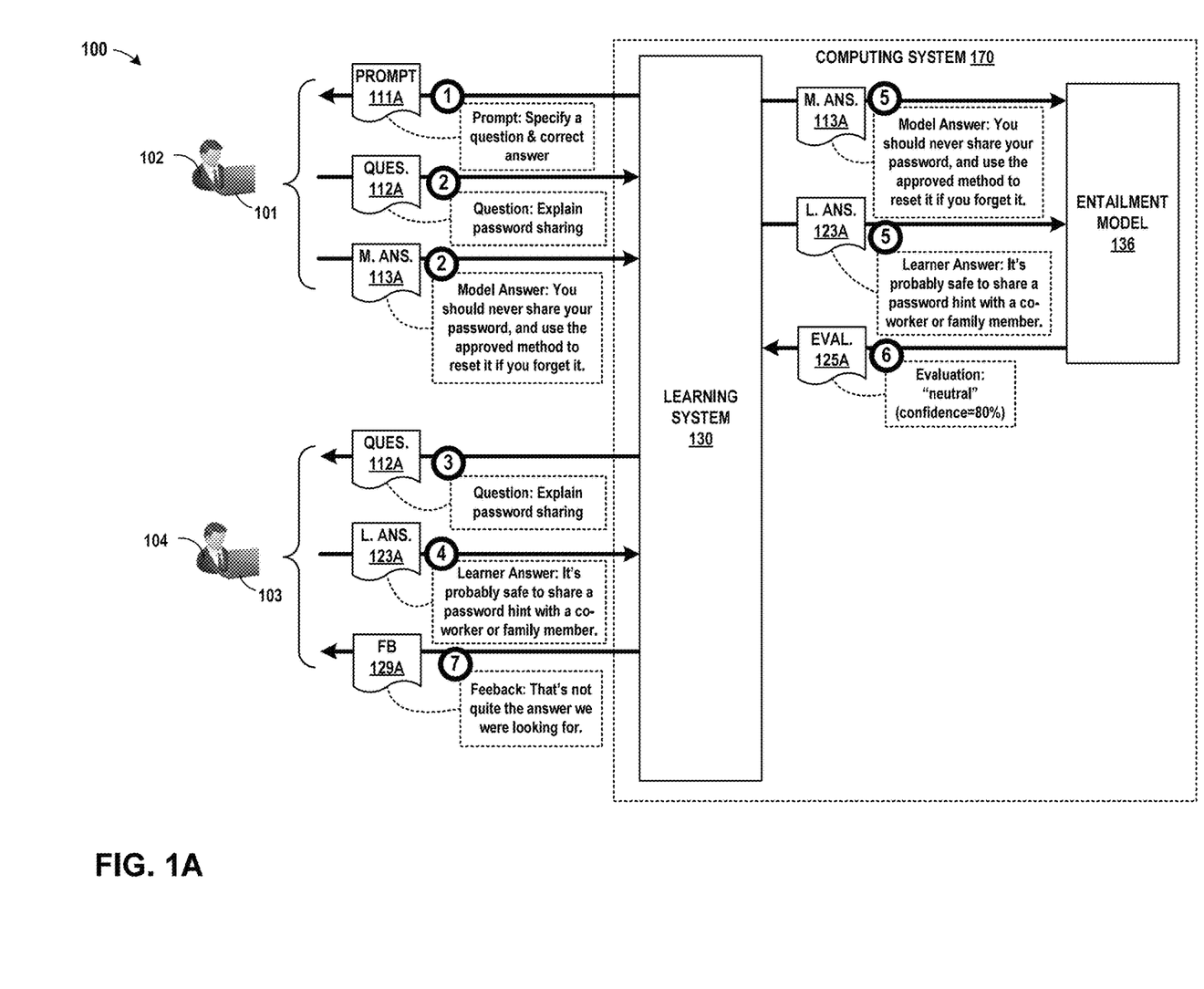
FIG. 1A is a conceptual diagram illustrating an example system for testing the knowledge of a learner based on the learner's response to an open-ended question, in accordance with one or more aspects of the present disclosure.

FIG. 1A is a conceptual diagram illustrating an example system for testing the knowledge of a learner based on the learner's response to an open-ended question, in accordance with one or more aspects of the present disclosure. System 100 of FIG. 1A includes computing system 170, computing device 101, and computing device 103. Computing system 170 includes learning system 130 and entailment model 136.

Computing device 101 may be operated by instructional designer 102, and computing device 103 may be operated by learner 104. Computing device 101 and computing device 103 may be implemented as any suitable computing system including any mobile, non-mobile, wearable, and/or non-wearable computing device, which may be a mobile phone or tablet, or a laptop or desktop computing device. Other possible computing devices may include a computerized watch, a computerized glove or gloves, a personal digital assistant, a virtual assistant, a gaming system, a media player, an e-book reader, a television or television platform, an automobile, or any other type of wearable, non-wearable, mobile, or non-mobile computing device that may perform operations in accordance with one or more aspects of the present disclosure.

Computing device 101 may interact with instructional designer 102 by, for example, a visual user interface presented on a display screen associated with computing device 101. Such a display screen may present a graphical user interface that instructional designer 102 may interact with through a pointing device or touch interface. In other examples, computing device 101 may interact with instructional designer 102 through an interactive voice interface, which may enable instructional designer 102 to communicate with computing device 101 by simply speaking or otherwise engaging in an oral or audio interaction with computing device 101. In still other examples, computing device 101 may interact with instructional designer 102 through a chat interface, through a visual recognition interface, through gestures, or in any appropriate manner now known or hereinafter developed.

Similarly, learner 104 may interact with computing device 103 through correspondingly diverse and varied ways, which may include, in the manner discussed in connection with computing device 101, a graphical user interface, an interactive voice interface, a chat interface, a visual interface, a gesture interface, or through any other appropriate means now known or hereinafter developed.

Computing system 170 also may be implemented as any suitable computing system, including one or more server computers, workstations, mainframes, appliances, cloud computing systems, and/or other computing devices that may be capable of performing operations and/or functions described in accordance with one or more aspects of the present disclosure. In other examples, computing system 170 may represent or be implemented through one or more virtualized compute instances (e.g., virtual machines, containers) of a data center, cloud computing system, server farm, and/or server cluster. In these or examples, computing system 170 may be accessible over a network as a web service, website, or other service platform.

Computing system 170 is primarily illustrated and described herein as separate and distinct from each of computing devices 101 and 103. However, in other examples, some or all aspects of computing device 101 and/or computing device 103 may be incorporated into computing system 170.

Learning system 130, shown included within computing system 170, may be a learning management system that serves as an abstraction interface to an artificial intelligence model, such as entailment model 136. Learning system 130 may perform functions relating to interacting with instructional designer 102 through computing device 101, and/or interacting with learner 104 through computing device 103. Such interactions may include presenting open-ended questions to learner 104 through user interfaces presented by computing device 103, receiving responses from learner 104, and providing feedback to learner 104 about evaluations of those responses. Learning system 130 may evaluate or score responses provided by learners 104, and may do so by engaging one or more models (e.g., entailment model 136) or interacting with one or more other computing systems. Although learning system 130 is illustrated in FIG. 1A as being included within computing system 170, learning system 130 may, in other examples, be implemented as a separate system.

Entailment model 136, also shown within computing system 170, may be a model trained to test for textual entailment. In examples described herein, entailment model 136 may expose an interface or application programming interface that enables two sentences to be checked, compared, or otherwise evaluated for entailment. In one example, entailment model 136 may expose a "CheckSimilarity( )" function that is configured to receive a pair of sentences as arguments or parameters. Such a CheckSimilarity( ) function might return one of three responses: entailment, contradiction, or neutrality. In some examples, entailment model 136 may be implemented as a model using Bidirectional Encoder Representations from Transformers (BERT) techniques. BERT is a transformer-based machine learning technique for natural language processing (NLP). Entailment model 136 may be initially trained using an existing corpus of sentence pairs (e.g., the Stanford Natural Language Inference corpus) to predict sentence semantic similarity.

In at least some examples, entailment model 136 is non-directional, in the sense that it might not matter in which order two sentences are presented to entailment model 136. Entailment model 136 might, however, be considered reflexive. Although entailment model 136 is illustrated in FIG. 1A as being included within computing system 170, entailment model 136 may, in other examples, be implemented as a separate system (e.g., accessible over a network).

System 100 illustrated in FIG. 1A may be used to test the knowledge of learner 104 based on a test question designed by instructional designer 102. System 100 may evaluate a response received from learner 104 by comparing the response to a "correct" or "model" response to the question, also designed by the instructional designer 102. Such a process can be illustrated using FIG. 1A.

In FIG. 1A, and in accordance with one or more aspects of the present disclosure, computing system 170 of system 100 may prompt an instructional designer for information that can be used to test the knowledge of a learner. For instance, in an example that can be described in the context of FIG. 1A, learning system 130 of computing system 170 outputs prompt 111A to computing device 101 operated by instructional designer 102 (see arrow labeled as "1"). Computing device 101 presents a user interface that includes prompt 111A (e.g., asking instructional designer 102 to "Specify a question & correct answer"). Computing device 101 detects input that it determines corresponds to a response to prompt 111A. In the example being described, the response includes question 112A (e.g., "Explain password sharing") and model answer 113A ("You should never share your password, and use the approved method to reset it if you forget it").

Model answer 113A may be the answer that instructional designer 102 would consider to be the "correct" or "most correct" answer to question 112A. However, depending on the context and the specific question 112A, instructional designer 102 might consider a number of answers to be equally correct, so answer 113A is primarily described herein as a "model" answer, rather than "the correct" answer. Model answer 113A may nevertheless be, depending on the specific situation, considered to be the "most correct" answer to question 112A, the "only correct" answer to question 112A, or one of a "range of correct" answers to question 112A.

Computing system 170 may store question 112A and model answer 113A. For instance, continuing with the example being described in the context of FIG. 1A, computing device 101 outputs question 112A and model answer 113A to learning system 130 (see arrows labeled "2"). Learning system 130 stores question 112A and model answer 113A in a data store or other storage system. In some examples, learning system 130 may receive a series of questions (collectively, "questions 112") and corresponding model answers (collectively, "model answers 113") that might be used in a full test sequence to be presented to a learner. Learning system 130 stores each of such questions 112 and corresponding model answers 113 in a storage system. In some cases, learning system 130 may catalogue, tag, or otherwise organize questions 112 and corresponding model answers 113 within the storage system to enable efficient recall and use when in testing particular topics.

Computing system 170 may prompt a learner for an answer to a question received from instructional designer 102. For instance, continuing with the example being described in the context of FIG. 1A, learning system 130 outputs question 112A ("Explain password sharing") to computing device 103 (see arrow labeled "3"). Computing device 103 presents a user interface at computing device 103 that includes question 112A, thereby presenting one of the questions specified by instructional designer 102 to learner 104 operating computing device 103. Computing device 103 detects input that it determines corresponds to an answer by learner 104 to question 112A. Computing device 103 outputs learner answer 123A ("It's probably safe to share a password hint with a co-worker or family member") to learning system 130 (arrow labeled "4").

Computing system 170 may evaluate the learner's answer to the question. For instance, still continuing with the example and with reference FIG. 1A, learning system 130 compares model answer 113A (received from computing device 101) and learner answer 123A (received from computing device 103). To perform such a comparison, learning system 130 outputs model answer 113A and learner answer 123A to entailment model 136 (arrows labeled "5"). In the example being described, entailment model 136 is a model trained to determine the presence of entailment between two phrases, sentences, and/or short responses. In response, entailment model 136 generates evaluation 125A. In some examples, entailment model 136 is trained to generate a positive response if entailment model 136 determines the presence of entailment between the correct answer and the learner answer. Entailment model 136 returns a negative response if entailment is not detected. Entailment model 136 may return a neutral response if the model determines that there is neither entailment nor contradiction (or is otherwise not able to reach a conclusion about entailment). Entailment model 136 may also, in some examples, include a confidence value with evaluation 125A, indicating the extent to which entailment model 136 is confident about its entailment assessment (positive, negative, neutral). In the example illustrated in FIG. 1A, evaluation 125A indicates "neutral," indicating neither entailment nor contradiction for learner answer 123A and model answer 113A.

Computing system 170 may provide feedback to the learner. For instance, again with reference to FIG. 1A, learning system 130 receives evaluation 125A from entailment model 136 in response to submitting model answer 113A and learner answer 123A to entailment model 136 (arrow labeled "6"). Learning system 130 uses evaluation 125A to determine appropriate feedback to provide to learner 104. If evaluation 125A indicates entailment (i.e., a "positive" result), learning system 130 concludes that learner answer 123A is sufficiently similar to model answer 113A to be correct. In the example being described, evaluation 125A indicates no entailment (i.e., a "negative" or "neutral" result), so learning system 130 concludes that learner answer 123A is not a correct response. Learning system 130 outputs feedback 129A to computing device 103 (arrow labeled "7"). Computing device 103 presents a user interface that includes feedback 129A, thereby informing learner 104 about the evaluation of learner answer 123A.

In the example illustrated in FIG. 1A, model answer 113A ("You should never share your password, and use the approved method to reset it if you forget it") and learner answer 123A ("It's probably safe to share a password hint with a co-worker or family member") do not explicitly contradict. However, they do not have the same meaning. Accordingly, feedback 129A indicates that learner answer 123A is incorrect (i.e., "not quite the answer we were looking for"). In some examples, particularly when learner answer 123A is determined to be incorrect, feedback 129A might include model answer 113A (or information about model answer 113A). Even where learner answer 123A is judged to be a "correct" answer, feedback 129A might include information about model answer 113A, since even if learner answer 123A is judged to be "correct," learner answer 123A is not likely to be identical to model answer 113A, and therefore, model answer 113A may provide useful information to learner 104.

Figure 1B:
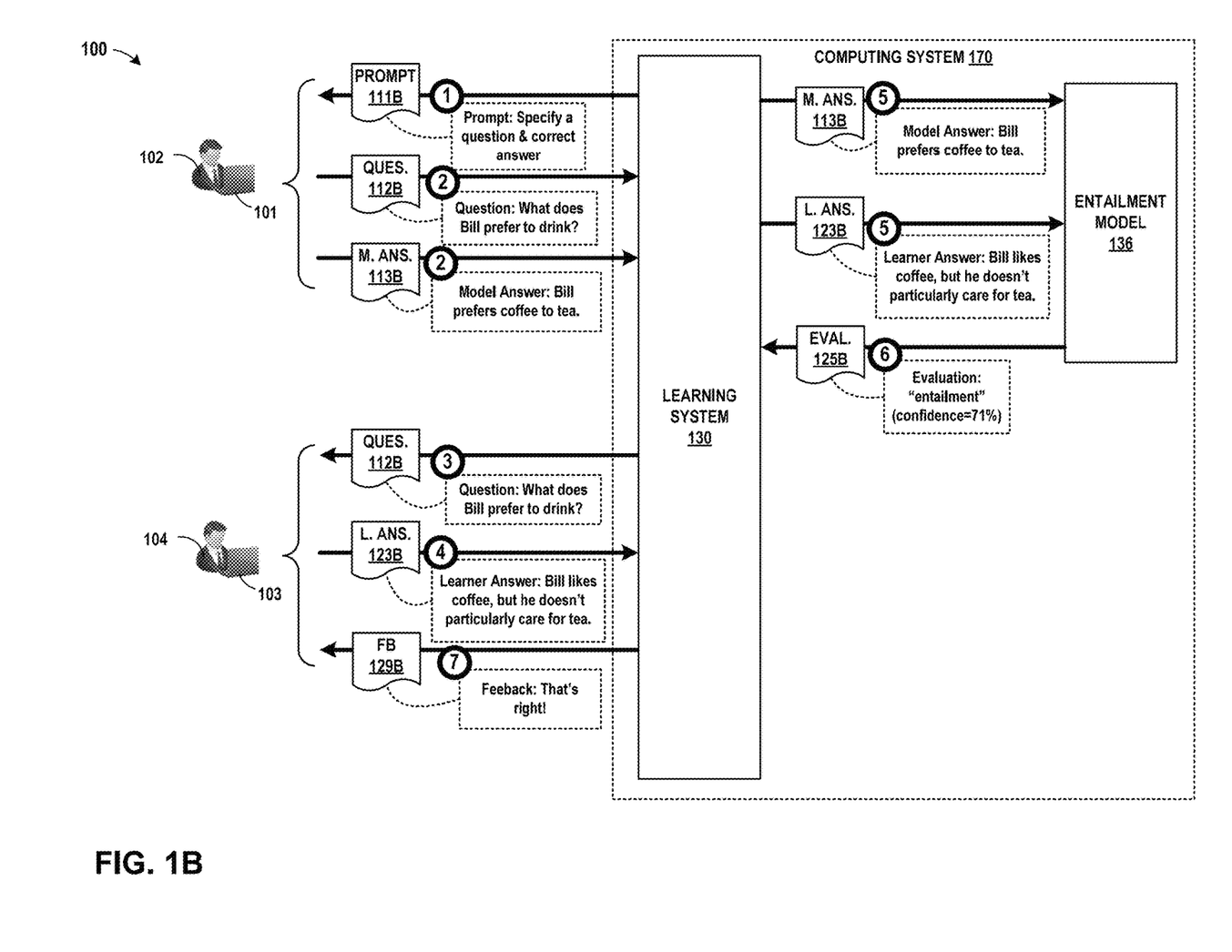
FIG. 1B is a conceptual diagram also illustrating an example system for testing the knowledge of a learner based on the learner's response to an open-ended question, in accordance with one or more aspects of the present disclosure.

FIG. 1B is another conceptual diagram illustrating an example system for testing the knowledge of a learner based on the learner's response to an open-ended question, in accordance with one or more aspects of the present disclosure. FIG. 1B is very similar to FIG. 1A and also illustrates system 100 including some or all of the same elements of FIG. 1A. Like-numbered elements illustrated in FIG. 1B thus correspond to elements illustrated in FIG. 1A and described in connection with FIG. 1A.

Like FIG. 1A, FIG. 1B illustrates an example in which a learner's answer to a question designed by instructional designer 102 is not identical to the model answer chosen by instructional designer 102. However, in the example of FIG. 1B and unlike the example illustrated in FIG. 1A, computing system 170 nevertheless evaluates the learner's response to be a correct answer.

Specifically, in FIG. 1B, and in a manner similar to FIG. 1A, computing system 170 may prompt an instructional designer for a question and answer. For instance, in an example that can be described in the context of FIG. 1B, learning system 130 outputs prompt 111B to computing device 101. Learning system 130 receives from computing device 101, based on input detected at computing device 101, question 112B and model answer 113B. Learning system 130 then outputs question 112B to computing device 103, which is operated by learner 104. Responsive to outputting question 112B and based on input detected by computing device 103, computing device 103 outputs learner answer 123B to learning system 130. In this example, learner answer 123B represents a response from learner 104 to question 112B.

Computing system 170 may evaluate the learner's response and provide feedback. For instance, continuing with the example and with reference to FIG. 1B, learning system 130 outputs model answer 113B and learner answer 123B to entailment model 136. In response, entailment model 136 outputs evaluation 125B to learning system 130. In FIG. 1B, evaluation 125B indicates "entailment," indicating that learner answer 123B is sufficiently similar to 112b to be characterized as a "correct" response. Learning system 130 outputs feedback 129B to computing device 103. Computing device 103 presents a user interface, indicating to learner 104 that learner answer 123B was a correct response.

Note that in at least some examples herein, question 112 is not necessarily relevant to any evaluation performed by entailment model 136 of learner answer 123. Rather, question 112 is often used merely to prompt learner 104 to provide an answer, and in that sense, question 112 might be considered "window dressing" in the context of the systems described in connection with FIG. 1A and FIG. 1B. Note that at least in some examples, question 112 might not be used by entailment model 136 when generating evaluation 125.

In some examples, learning system 130 may collect additional questions 112 and corresponding model answers 113 that can be used to more fully test a learner's knowledge about a particular topic. For instance, still referring to FIG. 1B, learning system 130 receives, from computing device 101, a series of additional questions 112 conceived of by instructional designer 102 for use in testing a learner's knowledge. Learning system 130 also receives, from computing device 101, a series of additional model answers 113, each corresponding to one of the additional questions 112. Such additional questions 112 and additional model answers 113 may be received at the same time that learning system 130 received question 112B and model answer 113B, as described above. In other examples, additional questions 112 and additional model answers 113 may be received at a later or different time.

Learning system 130 may present one or more additional questions 112 to learner 104. For instance, once again referring to FIG. 1B, learning system 130 outputs the series of additional questions 112 to computing device 103, normally one at a time. Learning system 130 receives, from computing device 103, a learner answer 123 in response to each of the additional questions 112. Learning system 130 evaluates each of the received learner answers 123 by presenting each learner answer 123 and its corresponding model answer 113 to entailment model 136. Entailment model 136 generates a series of evaluations 125, each corresponding to an evaluation of one pair of additional learner answers 123 and additional model answers 113. Learning system 130 uses the series of evaluations 125 to prepare feedback 129. Learning system 130 outputs such feedback 129 to computing device 103, thereby informing learner 104 about the extent to which learner answers 123 were judged to be correct.

Techniques described herein may provide certain technical advantages. For instance, by focusing on evaluating learner answers that are short phrases and/or sentences, computing system 170 may be able to effectively compare, in an automated way, learner answers 123 and model answers 113. Note that in the examples described in connection with FIG. 1A and FIG. 1B, the evaluations of learner answers 123 could be performed with little to no human evaluation of learner answers 123.

In addition, by using an artificial intelligence model trained to determine the presence of entailment between two sentences (or between two phrases), computing system 170 may be able to accurately determine whether a given learner answer 123 is correct by applying the model to both learner answer 123 and corresponding model answer 113. An entailment model, as used in the manner described herein, may be able to effectively determine the similarity of semantic intent between the two answers in a learning context. Entailment models have other uses, not in the educational context. However, use of such a model in the educational context may have significant benefits, in terms of enabling automation, accuracy, and development of efficient and effective learning management systems.

Still further, by focusing on phrase-length to sentence-length answers and using entailment models, system 100 as illustrated in FIG. 1A and FIG. 1B may be able to more effectively test specific information retention than either traditional knowledge check questions or existing essay evaluation machine learning models, which have been shown to be lacking due to the shortcomings mentioned above. Techniques described herein enable design of systems that test what a learner has retained in their own words rather than based on that learner's ability to guess a correct answer from cues contained in a "distractor" option or the limitations of the distractor options presented without using human-hours to evaluate answers.

Figure 2:
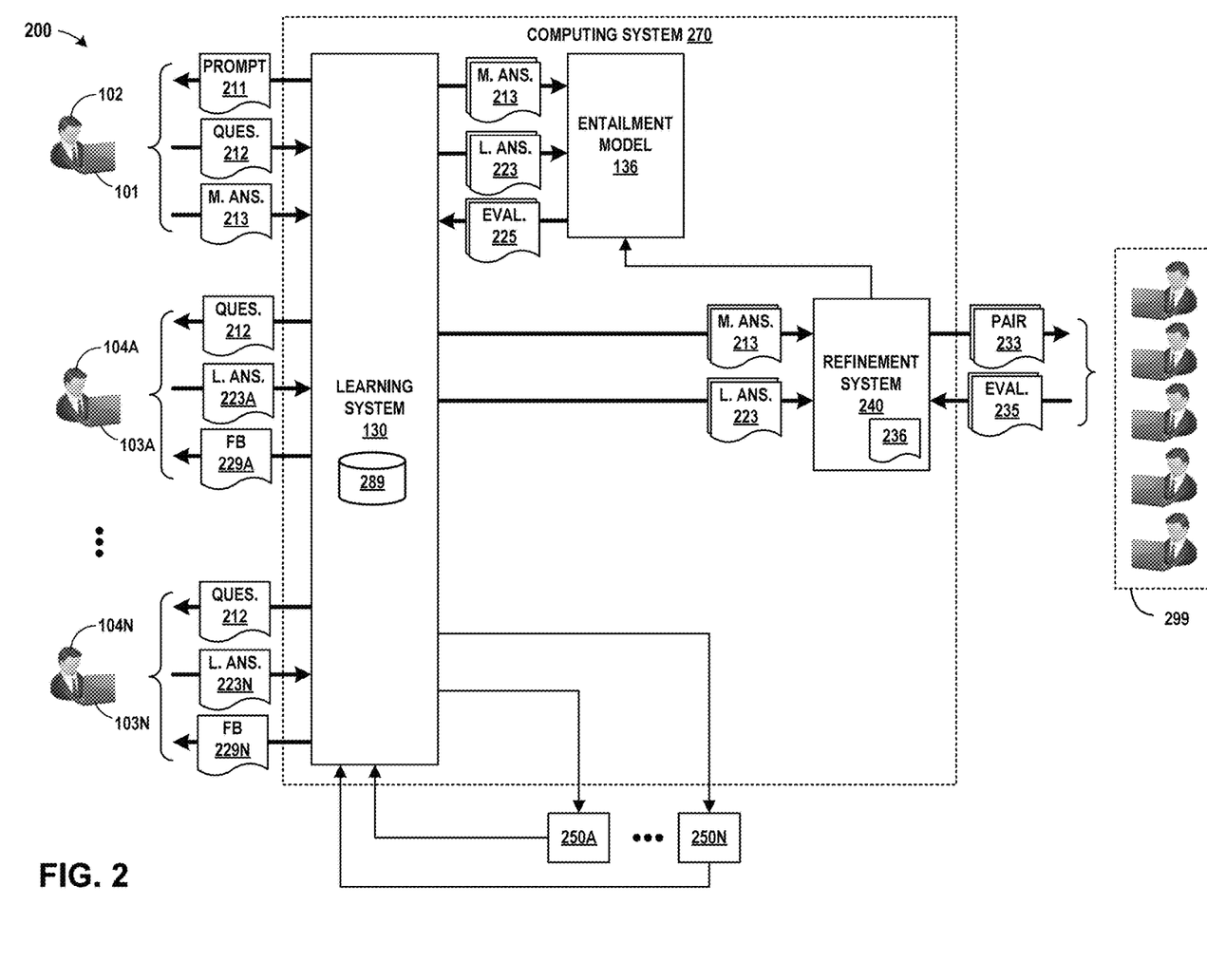
FIG. 2 is a conceptual diagram illustrating another example system for testing the knowledge of a learner, in accordance with one or more aspects of the present disclosure.

FIG. 2 is a conceptual diagram illustrating another example system for testing the knowledge of a learner, in accordance with one or more aspects of the present disclosure. System 200 of FIG. 2 includes computing system 270, computing device 101, computing device 103A through computing device 103N ("computing devices 103," representing any number of computing devices 103), and one or more downstream systems 250A through 250N ("downstream systems 250"). Like FIG. 1A and FIG. 1B, computing device 101 may be operated by instructional designer 102. In addition, each of computing devices 103 may be operated one of learners 104A through 104N ("learners 104").

Computing system 270 may be considered an example or alternative implementation of computing system 170 of FIG. 1A or FIG. 1B. Computing system 270 is illustrated in a manner similar to computing system 170 of FIG. 1A and FIG. 1B, and includes some of the same elements illustrated in FIG. 1A and FIG. 1B, including learning system 130 and entailment model 136. In general, like-numbered elements illustrated in FIG. 2 thus correspond to elements illustrated in FIG. 1A and FIG. 1B and described in connection with FIG. 1A and FIG. 1B. In FIG. 2, learning system 130 includes data store 289, which may be used to store various prompts 211, questions 212, model answers 213, learner answers 223, evaluations 225, and other information used during operation of learning system 130 and/or computing system 270.

Computing system 270 also includes a refinement computing system or refinement system 240, which is used to modify, update, and/or refine operations of entailment model 136 as further described herein. In some examples, refinement system 240 may use services provided by a panel of judges 299. In such an example, panel of judges 299 may evaluate various answer pairs 233 to generate one or more answer pair evaluations 235.

One or more downstream systems 250, also illustrated in FIG. 2, may represent systems that operate based on inputs from computing system 270. In some cases, one or more of such downstream systems 250 may be controlled, configured, or operated by computing system 270. One or more downstream systems 250 may represent systems that perform or implement policy for an organization that uses computing system 270 for educational purposes (e.g., evaluating the knowledge level of members of the organization). Such an organization may be a bank or other business, an educational institution or school, or any other organization that seeks to evaluate the knowledge of one or more of a group of learners 104.

In some examples, one or more of downstream systems 250 may, based on signals from computing system 270, evaluate learning effectiveness as related to learners 104 and learning initiatives conceived by one or more instructional designers 102. Alternatively, or in addition, one or more downstream systems 250 may, based on signals from computing system 270, make modifications to a data store containing grading information for each of learners 104, or for an aggregation of learners 104. Such an aggregation of grading information may be used by downstream systems 250 to develop, affect, or modify grading policies, educational policies, or learning standards. Such an aggregation may also be used to determine whether computing system 270 should be transitioned from an experimental or development system into one that can be used in production within the organization. Alternatively, or in addition, one or more downstream systems 250 may, based on signals from computing system 270, make modifications to educational offerings or courses that may be implemented or tested by computing system 270. Alternatively, or in addition, one or more downstream systems 250 may, based on signals from computing system 270, adjust privileges, capabilities, roles, and/or duties of one or more members of an organization, which may include making such adjustments with respect to one or more learners 104 based on evaluations of learner answers 123 and/or scores associated with learners 104. Alternatively, or in addition, downstream systems 250 may also include systems that perform other functions, such as functions relating to compliance (e.g., with respect to rules or policies of an organization), regulatory requirements (e.g., relating to government regulations that may apply to the organization), or reporting (e.g., for the purpose of communicating results, evaluations, or related trends to various stakeholders).

In FIG. 2, and in accordance with one or more aspects of the present disclosure, computing system 270 may receive a set of question and answer pairs from an instructional designer. For instance, in an example that can be described in the context of FIG. 2, learning system 130 of computing system 270 outputs prompt 211 to computing device 101, operated by instructional designer 102. Learning system 130 receives input that it determines corresponds to one or more questions 212 and one or more model answers 213 (e.g., based on input from instructional designer 102 detected at computing device 101). Typically, learning system 130 receives multiple questions 212 and multiple model answers 213 in the form of question and answer pairs, where each question has a corresponding "correct" or "model" answer. Questions 212 can be used for presenting, to one or more of learners 104, a multi-question knowledge test, often pertaining to a common topic.

Computing system 270 may present a series of questions 212 to learner 104A. Learning system 130 outputs question 212 to computing device 103A, operated by learner 104A. In response, learning system 130 receives, from computing device 103A (e.g., based on input from learner 104A detected at computing device 103A), learner answer 223A. Learning system 130 outputs model answer 213 and learner answer 223A to entailment model 136. Entailment model 136 responds by outputting evaluation 225 for learner answer 223A to learning system 130. Based on evaluation 225 for learner answer 223A, learning system 130 generates feedback 229A and outputs feedback 229A to computing device 103A, thereby informing learner 104A whether learner answer 223A was correct. Learning system 130 may continue to present, to learner 104A operating computing device 103A, each of a series of questions 212 by outputting each new question 212 in succession, receiving a corresponding learner answer 223A, obtaining evaluation 225 for the learner answer, and presenting feedback 229A to learner 104A. In some examples, learning system 130 may present each instance of feedback 229A after each question. In other examples, learning system 130 may present instances of feedback 229A at a later time (e.g., after all questions in the subject matter test have been presented to learner 104A).

Computing system 270 may similarly present the same series of questions 212 to other learners. For instance, continuing with the example being described in the context of FIG. 2, learning system 130 outputs a series of questions 212 to any number of computing devices 103 (e.g., computing devices 103A through 103N, representing any number of devices), each operated by a corresponding one of learners 104 (e.g., any of learners 104A through 104N). Learning system 130 receives learner answers 223 from each of computing devices 103, and evaluates such learner answers 223 by applying entailment model 136 to each learner answer 223 and the corresponding model answer 213. In each instance, entailment model 136 generates evaluation 225. Learning system 130 analyzes each of evaluations 225 and determines whether each corresponding learner 104 correctly answered the corresponding question 212. Learning system 130 provides feedback to each of learners 104A through 104N by outputting appropriate feedback 229 for each question answered by learners 104.

Computing system 270 may maintain an archive of questions, model answers, and learner answers. For instance, in the example being described, learning system 130 receives, from each of computing devices 103, each of learner answers 223 so that learning system 130 can present each of learner answers 223 (along with corresponding model answers 213) to entailment model 136 for evaluation. In connection with this process, learning system 130 stores each of learner answers 223, along with the corresponding model answers 213, within data store 289. In some examples, learning system 130 may also store questions 212 associated with each of model answers 213 and learner answers 223. In some examples, data store 289 may store pairs of questions 212 and model answers 213 in one table within a database, and may store learner answers 223 in another table. Learning system 130 may also treat questions 212, model answers 213, and particularly learner answers 223, to ensure that such information does not include any private, sensitive, or confidential information. Such treatment may include ensuring that no personally-identifiable information about any of learners 104 is stored.

Computing system 270 may use information stored in data store 289 to generate new training data. For instance, still continuing with the example being described in the context of FIG. 2, learning system 130 collects, over time, a significant number of learner answers 223 and model answers 213. Eventually, learning systems 130 may collect a significant number of pairs of learner answers 223 and model answers 213, each pair derived from querying various learners 104 using questions 212 designed by one or more instructional designers 102 and receiving corresponding learner answers 223. Once a sufficient amount of information has been collected, learning system 130 accesses archived learner answers 223 along with archived model answers 213 within data store 289. Learning system 130 outputs information about the accessed learner answers 223 and model answers 213 to refinement system 240. When outputting this information to refinement system 240, learning system 130 structures, tags, or otherwise organizes the answers so that refinement system 240 can determine which learner answer 223 corresponds to a given model answer 213. Refinement system 240 assembles the received information into answer pairs 233, where such each such answer pair 233 includes a model answer and a corresponding learner answer received from one of learners 104. Refinement system 240 performs an evaluation of each of answer pairs 233 to determine whether the learner answer included within the answer pair 233 is similar to the model or correct answer included within the answer pair 233. If the answers are sufficiently similar, the learner answer can be considered a "correct" answer. Each of answer pairs 233 is tagged with information about the evaluation. Refinement system 240 uses this tagged information to assemble a new set of training examples with answer pairs 233 labeled as either "correct" or "incorrect" in new training data 236.

In some examples, refinement system 240 may generate new training data 236 using another system. For instance, refinement system 240 may output answer pairs 233 to another evaluation system (not shown in FIG. 2) that performs a linguistic assessment, entailment assessment, or other type of assessment to determine whether answer pairs 233 can be judged for similarity.

In other examples, however, refinement system 240 may generate new training data 236 using a panel of human judges. For instance, referring again to FIG. 2, refinement system 240 outputs answer pairs 233 to a set of computing devices, each operated by one of a panel of human judges 299. Each computing device (e.g., a "panel computing device") operated by a judge 299 presents a user interface that includes an answer pair 233, presenting both the model answer and the learner answer from answer pair 233. Each computing device, for each answer pair 233, detects input that represents a respective judge's assessment of similarity between the answers. Typically, each judge 299 is allowed to evaluate a given answer pair 233 just once, and for a panel of five judges 299, refinement system 240 would collect five judgments for each answer pair 233. Preferably, the five judgments performed by judges 299 would be unanimous, and would indicate either a match (i.e., the learner answer is correct) or a failure to match (i.e., the learner answer is not correct or is not sufficiently correct). If the five judgments are not unanimous, refinement system 240 may determine that enough of judges 299 are in agreement to arrive at an appropriate assessment of the answer pair 233. Otherwise, the answer pair 233 and its corresponding answer pair evaluations 235 might not be included within new training data 236.

Computing system 270 may refine entailment model 136. For instance, still continuing with the example of FIG. 2, refinement system 240 retrains entailment model 136 with new training data 236, based on the evaluation of answer pairs by the panel of judges 299. Refinement system 240 outputs information to entailment model 136, reconfiguring and/or updating entailment model 136 as a new model trained using entailment model 136. Entailment model 136 thereafter assesses learner answers 223 and model answers 213 to generate evaluations 225 using the new updated model. In some examples, the process of refinement takes place periodically, occasionally, or continually, thereby ensuring that some of the more recent pairs of model answers 213 and learner answers 223 are independently evaluated and used as the basis of training data used for refining entailment model 136. Since the way people express themselves through speech or writing continues to evolve, it may be appropriate to continue refining entailment model 136 for as long as entailment model 136 is used. Where new training data 236 is developed to include hundreds of thousands of answer pairs (e.g., on the order of 200,000 to 600,000 pairs), each tagged with a curated or ground truth label of semantic similarity, significant improvements in entailment model 136 may be achieved, enabling entailment model 136 to provide significant accuracy in system 200.

Note in at least some examples, use of new training data 236 is used not to retrain entailment model 136 to determine whether specific questions 112 are being answered correctly. Rather, new training data 236 is used to train or retrain entailment model 136 to determine whether entailment exists for responses to the type of questions that instructional designers 102 would design in a system such as that of FIG. 2. In other words, entailment model 136 may be initially trained using a pre-existing corpus of training data, comprising pairs of sentences that are labeled to indicate the presence or absence of entailment. Existing training data, such as Stanford Natural Language Inference corpus, could be used for initial training of entailment model 136, thereby enabling entailment model 136 to be used immediately to generate accurate entailment predictions for any two pairs of sentences. This initial training data may also be effective to train entailment model 136 to identify entailment in answer pairs in an educational context (e.g., comparing model answers 213 and learner answers 223, as in system 200). But preexisting sets of training data might not be oriented to the kinds of sentences that an instructional designer would determine correspond to a "correct" answer. For example, the training data used for initial training might use sentence pairs that are not typical of the types of answer pairs that would result from an instructional designer designing a model answer 213 and a learner providing an answer to a question 212 designed by the instructional designer. Accordingly, it may be possible to significantly improve the predictive capabilities of entailment model 136 by training or retraining entailment model 136 using the types of sentence pairs that are representative of learner answers 223 and model answers 213. By retraining an existing entailment model 136 with the types of answer pairs that result from an educational context, as illustrated in FIG. 2, the entailment model 136 may be significantly (or even dramatically) improved and fine-tuned for use in educational contexts as in FIG. 2.

In some cases, refinement system 240 may receive, from learning system 130 or from another system, synthetic data, which may be data that has been generated by a computing system to mimic answers that might be provided by one or more learners 104 in response to one or more questions 212. In such an example, refinement system 240 may use such data to generate additional answer pairs 233 that can be evaluated by a panel of judges 299 (or by another computing system) to produce answer pair evaluations 235 for the synthetic data. Based on these answer pair evaluations 235, refinement system 240 may generate additional training data that is used to refine and/or retrain entailment model 136.

In some examples, the same entailment model 136 may be used to test each of learners 104. In other examples, however, different entailment models 136 may be used to test different subsets of learners 104. For example, it may be appropriate for computing system 270 to use different entailment models 136 when evaluating learners 104 in different geographical regions or regions of the world in which different languages are spoken or different dialects of the same language are spoken. Alternatively, or in addition, it may be appropriate for computing system 270 to use a different entailment model 136 when evaluating learners having a different educational focus. In such examples, computing system 270 may be implemented with multiple entailment models 136, with one or more entailment models 136 for each subset of learners 104. Each such entailment model 136 may be trained using a set of training data appropriate to the subset of learners 104 for which that entailment model 136 is to be used. To identify the appropriate entailment model 136, computing system 270 may identify various attributes of a given learner 104, which may include the location of a given learner 104 (e.g., based on an IP address of that learner's computing device 103), educational focus of learner 104 (e.g., based on a learner profile, through user input, or through any other appropriate means), or other attributes of a given learner 104.

Based on operations performed by or data generated by computing system 270, computing system 270 may control or adjust the operation of downstream computing systems. For instance, referring once again to FIG. 2, learning system 130 evaluates, over time, learner answers 223, evaluations 225, and instances of feedback 229. Learning system 130 determines the extent of the knowledge represented by learners 104. Learning system 130 uses this information to control, affect, or otherwise modify the operation of one or more other systems, represented by one or more downstream systems 250.

For example, downstream system 250A may be used to implement policy for an organization that uses computing system 270 to train its employees (e.g., learners 104). Learning system 130 of computing system 270 may output, to downstream system 250A, information about the extent to which its employees have been trained in a particular subject area. Downstream system 250A uses the information to assess the knowledge base of learners 104. Downstream system 250A determines, based on the information, one or more new subject areas that should be emphasized in training. Downstream system 250A implements a training program to address the new subject areas. As part of the implementation, downstream system 250A may perform research, interact with other computing systems, compile information that can be used to create curricula, and prepare materials that can be used by instructional designers 102 to develop the curricula. In some cases, downstream system 250A may interact with learning system 130 of computing system 270 to implement a training program for learners 104.

In other examples, one or more other downstream systems 250 may perform other operations at the direction of computing system 270. Such other operations may pertain to compliance (e.g., with respect to rules or policies of an organization), regulatory requirements (e.g., relating to government regulations that may apply to the organization), or reporting (e.g., for the purpose of communicating results, evaluations, or related trends to various stakeholders).

Figure 3:
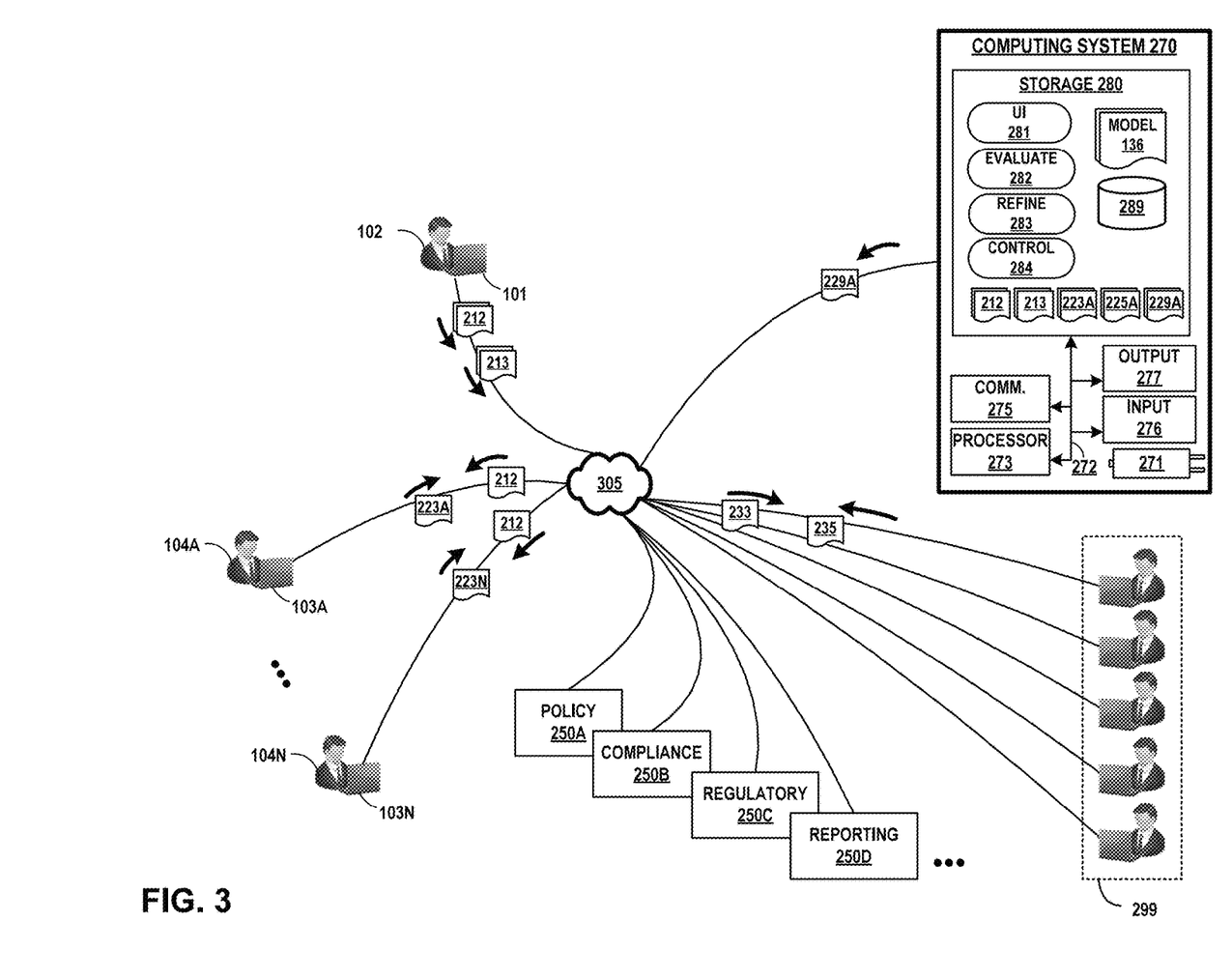
FIG. 3 is a block diagram illustrating an example system for testing the knowledge of a learner based on the learner's response to an open-ended question, in accordance with one or more aspects of the present disclosure.

FIG. 3 is a block diagram illustrating an example system for testing the knowledge of a learner based on the learner's response to an open-ended question, in accordance with one or more aspects of the present disclosure. FIG. 3 illustrates computing system 270 communicating with computing device 101, computing devices 103, and systems 250 (e.g., downstream systems 250A through 250N) over network 305. Network 305 may represent any public or private communications network or other network, and in some examples, may be or may be part of the internet.

Computing system 270 of FIG. 3 may correspond to computing system 270 of FIG. 2, but is illustrated differently in FIG. 3 to facilitate a description of certain components, modules, and other aspects of computing system 270. Computing system 270 of FIG. 3 may be considered an alternative implementation or an example implementation of computing system 270 of FIG. 2. Computing devices 101 and computing devices 103 may correspond to computing devices 101 and computing devices 103 illustrated in FIG. 1A, FIG. 1B, and/or FIG. 2. Similarly, downstream systems 250 may correspond to downstream systems 250 illustrated in FIG. 2. In general, like-numbered elements illustrated in FIG. 3 may represent previously-described elements illustrated in other figures herein.

For ease of illustration, computing system 270 is depicted in FIG. 3 as a single computing system. However, computing system 270 may, in other examples, comprise multiple devices or computing systems distributed across a data center or multiple data centers. For example, one or more computing systems may implement functionality described herein as being performed by user interface module 281. One or more other computing systems may implement functionality described herein as being performed by evaluation module 282. Similarly, one or more computing systems may implement functionality described herein as being performed by refinement module 283 and/or entailment model 136 (or entailment models 136). Computing system 270 (or various modules illustrated in FIG. 3 as included within computing system 270) may be implemented through distributed virtualized compute instances (e.g., virtual machines, containers) of a data center, cloud computing system, server farm, and/or server cluster.

In FIG. 3, computing system 270 is shown with underlying physical hardware that includes power source 271, one or more processors 273, one or more communication units 275, one or more input devices 276, one or more output devices 277, and one or more storage devices 280. Storage devices 280 may include user interface module 281, evaluation module 282, refinement module 283, and control module 284. One or more of the devices, modules, storage areas, or other components of computing system 270 may be interconnected to enable inter-component communications (physically, communicatively, and/or operatively). In some examples, such connectivity may be provided by through communication channels, which may include a system bus (e.g., communication channel 272), a network connection, an inter-process communication data structure, or any other method for communicating data.

Power source 271 of computing system 270 may provide power to one or more components of computing system 270. One or more processors 273 of computing system 270 may implement functionality and/or execute instructions associated with computing system 270 or associated with one or more modules illustrated herein and/or described below. One or more processors 273 may be, may be part of, and/or may include processing circuitry that performs operations in accordance with one or more aspects of the present disclosure. One or more communication units 275 of computing system 270 may communicate with devices external to computing system 270 by transmitting and/or receiving data, and may operate, in some respects, as both an input device and an output device. In some or all cases, communication unit 275 may communicate with other devices or computing systems over network 305 or over other networks.

One or more input devices 276 may represent any input devices of computing system 270 not otherwise separately described herein, and one or more output devices 277 may represent any output devices of computing system 270 not otherwise separately described herein. Input devices 276 and/or output devices 277 may generate, receive, and/or process output from any type of device capable of outputting information to a human or machine. For example, one or more input devices 276 may generate, receive, and/or process input in the form of electrical, physical, audio, image, and/or visual input (e.g., peripheral device, keyboard, microphone, camera). Correspondingly, one or more output devices 277 may generate, receive, and/or process output in the form of electrical and/or physical output (e.g., peripheral device, actuator).

One or more storage devices 280 within computing system 270 may store information for processing during operation of computing system 270. Storage devices 280 may store program instructions and/or data associated with one or more of the modules described in accordance with one or more aspects of this disclosure. One or more processors 273 and one or more storage devices 280 may provide an operating environment or platform for such modules, which may be implemented as software, but may in some examples include any combination of hardware, firmware, and software. One or more processors 273 may execute instructions and one or more storage devices 280 may store instructions and/or data of one or more modules. The combination of processors 273 and storage devices 280 may retrieve, store, and/or execute the instructions and/or data of one or more applications, modules, or software. Processors 273 and/or storage devices 280 may also be operably coupled to one or more other software and/or hardware components, including, but not limited to, one or more of the components of computing system 270 and/or one or more devices or systems illustrated or described as being connected to computing system 270.

Data store 289 of computing system 270 may represent any suitable data structure or storage medium for storing information relating to learner evaluations, including, but not limited to, questions presented to learners (e.g., questions 212), answers received from learners (e.g., learner answers 223), and corresponding correct or model answers (e.g., model answers 213). The information stored in data store 289 may be searchable and/or categorized such that one or more modules within computing system 270 may provide an input requesting information from data store 289, and in response to the input, receive information stored within data store 289. Data store 289 may be primarily maintained by evaluation module 282.

User interface module 281 may perform functions relating to presenting one or more questions 212 to learners 104 (e.g., through computing devices 103), receiving corresponding learner answers 223, and presenting feedback to learners 104. Evaluation module 282 may perform functions pertaining to determining whether learner answers 223 are sufficiently similar to model answers 213 to be judged as "correct" answers. Refinement module 283 may perform functions relating to retraining entailment model 136 or otherwise refining entailment model 136 using additional training data. Control module 284 may perform functions relating to controlling one or more downstream systems 250 based on operations of computing system 270 or data generated by computing system 270.

In FIG. 3, and in accordance with one or more aspects of the present disclosure, computing system 270 may prepare to test the knowledge of a group of learners. For instance, in an example that can be described in the context of FIG. 3, user interface module 281 of computing system 270 causes communication unit 275 of computing system 270 to output a signal over network 305. Computing device 101, operated by instructional designer 102, detects a signal over 305. Based on the signal, computing device 101 presents a user interface, prompting instructional designer 102 to specify one or more questions and a model answer for each of the questions. Computing device 101 outputs, over network 305, questions 212 and a corresponding model answer 213 for each of questions 212. Communication unit 275 of computing system 270 detects a signal and outputs an indication of the signal to user interface module 281. User interface module 281 determines that the signal includes questions 212 and model answers 213 from instructional designer 102.

Computing system 270 may present a question to a learner and receive a learner answer. For instance, continuing with the example being described in the context of FIG. 3, user interface module 281 of computing system 270 outputs a series of signals over network 305. Computing device 103A, operated by learner 104A, detects the signals and determines that the signals include question 212. Computing device 103A presents a user interface, prompting learner 104A to respond to question 212. Computing device 103A detects input that it determines corresponds to learner answer 223A. Computing device 103A outputs a signal over network 305, destined for computing system 270. Communication unit 275 of computing system 270 detects a signal that user interface module 281 determines corresponds to learner answer 223A in response to one of questions 212. User interface module 281 stores an answer pair, comprising learner answer 223A and model answer 213, within data store 289.

Computing system 270 may evaluate the learner's answer to the instructional designer's question. For instance, again referring to the example being described in the context of FIG. 3, user interface module 281 outputs information about learner answer 223A and corresponding model answer 213 to evaluation module 282 of computing system 270. Evaluation module 282 evaluates learner answer 223A and model answer 213 for similarity. In some examples, evaluation module 282 evaluates learner answer 223A and model answer 213 by calling a "CheckSimilarity( )" function made available by a model, such as entailment model 136. In such an example, entailment model 136 may be a machine learning model that has been trained (or retrained) to compare two phrases for entailment, such as that described in connection with FIG. 2. Entailment model 136 outputs, in response to receiving learner answer 223A and model answer 213, evaluation 225A. Evaluation 225A characterizes the relationship between learner answer 223A and model answer 213 as one of: (1) entailment, (2) contradiction, or (3) neutrality. Evaluation module 282 may also include, within evaluation 225A, a confidence percentage, indicating the level of certainty the model has in its characterization of the relationship between answers.

Computing system 270 may provide feedback to the learner. For instance, continuing with the example being described in the context of FIG. 3, evaluation module 282 outputs to user interface module 281 information about evaluation 225A. User interface module 281 generates feedback 229A, based on evaluation 225A. User interface module 281 causes communication unit 275 to output a signal over network 305. Computing device 103A detects a signal that includes feedback 229A. Computing device 103A presents feedback 229A to a learner 104A, informing learner 104A whether learner answer 223A was judged to be a correct or incorrect response to question 212.

Computing system 270 may similarly present questions to other learners 104. In a manner similar to that described above with respect to learner 104A, computing system 270 may communicate questions 212 over network 305 to each of computing devices 103. Each of computing devices 103 may present a user interface that includes one or more questions 212. Each of computing devices 103 detect a learner answer 223 and communicate such answers to computing system 270. For each answer received from one of learners 104, computing system 270 stores an answer pair (i.e., comprising a given learner answer 223 and its corresponding model answer 213) within data store 289, thereby accumulating an archive of answer pairs. Evaluation module 282 of computing system 270 evaluates each of learner answers 223 by comparing them to corresponding model answers 213.

Computing system 270 may evaluate the responses of the other learners 104 and provide feedback. In some examples, evaluation module 282 performs the evaluation by applying entailment model 136 to a pair of answers (e.g., (1) model answer 213 to question 212 and (2) a learner answer 223N from learner 104N). Applying entailment model 136 results in an evaluation 225 (e.g., evaluation 225N for learner answer 223N). Evaluation module 282 communicates evaluation 225 to user interface module 281. Based on evaluation 225, user interface module 281 generates feedback 229. User interface module 281 causes computing system 270 to communicate feedback 229 over network 305 to the appropriate computing device 103. Each computing device 103 presents information about the feedback for presentation for a respective learner 104.

Computing system 270 may assemble new training data comprising answer pairs labeled with a ground truth assessment of similarity. For instance, continuing with the example being described, refinement module 283 accesses pairs of learner answers 223 and model answers 213 that have been compiled in data store 289 while evaluating the knowledge of learners 104. Refinement module 283 packages the information as answer pairs 233. Refinement module 283 causes communication unit 275 to output a signal over network 305. One or more computing devices operated by a panel of judges 299 detect the signals and determine that the signals include a series of answer pairs 233. Computing devices operated by judges 299 present each of answer pairs 233 to a respective judge 299 and detect input about that judge's evaluation. Each computing device operated by one of judges 299 outputs answer pair evaluations 235 over network 305. Communication unit 275 of computing system 270 detects input that refinement module 283 determines corresponds to answer pair evaluations 235 from a panel of judges 299. Refinement module 283 evaluate answer pair evaluations 235 and determine the most appropriate or a "ground truth" assessment of each answer pair 233 evaluated by the panel of judges 299. Such assessments indicate whether a given answer pair 233 is sufficiently semantically similar such that the learner answer 223 within the pair can be assessed as a correct answer. Refinement module 283 compiles the assessments into new training data, corresponding to a set of answer pairs 233, each labeled with a ground truth assessment of the presence or absence of entailment (or alternatively, whether the answers are sufficiently similar to be judged as indicating a "correct" answer).

Computing system 270 may refine entailment model 136 using instances of learner answers 223 and model answers 213. For instance, again with reference to FIG. 3, refinement module 283 retrains entailment model 136 with the new training data, effectively updating, refining, and/or improving the predictive skill of entailment model 136. In some examples, such a refinement process may significantly improve the predictive capabilities of entailment model 136, since the new training data may more effectively train entailment model 136 to determine entailment for the specific types of answer pairs that arise in the context of a learning environment such as that illustrated in FIG. 1A, FIG. 1B, FIG. 2, and/or FIG. 3. Since the new training data may be more representative of actual uses cases than a pre-existing or generic set of training data, it may be appropriate to cause the retraining process to more heavily weight the effect of the new training data in training entailment model 136. However, where entailment model 136 is implemented through at least some types of neural networks, the neural network algorithm may be intelligent enough to appropriately consider the training data and bias the predictive capabilities of entailment model 136 accordingly.

Computing system 270 may control other systems that affect educational policy for an organization. For instance, once again with reference to the example being described in connection with FIG. 3, evaluation module 282 evaluates, over time, learner answers 223, evaluations 225, and instances of feedback 229 pertaining to operations of computing system 270 as used within an organization. Evaluation module 282 determines, based on this information, the extent of the knowledge represented by learners 104 and the effectiveness of learning initiatives established by the organization. Evaluation module 282 creates an educational policy and outputs information about the policy to control module 284. Control module 284 outputs a signal over network 305. A downstream system, such as downstream system 250A, detects the signal and determines that the signal corresponds to instructions to modify the operations of downstream system 250A to implement the policy (e.g., the policy created by evaluation module 282). For example, if downstream system 250A performs operations pertaining to implementing educational policy for an organization, downstream system 250A may, based on signals from computing system 270, adjust how the organization implements various procedures to reach its educational goals.

Control module 284 of computing system 270 may output signals over network 305 to control other downstream systems 250. For example, control module 284 may communicate with downstream system 250B to cause downstream system 250B to perform operations specified by an organization's internal policies and/or to comply with various initiatives established by the organization. Alternatively, or in addition, control module 284 may communicate with downstream system 250C to cause downstream system 250C to ensure operations align with various governmental regulatory requirements. Alternatively, or in addition, control module 284 may communicate with downstream system 250D to cause downstream system 250 to perform various reporting tasks.

Modules illustrated in FIG. 3 (e.g., user interface module 281, evaluation module 282, refinement module 283, and control module 284) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
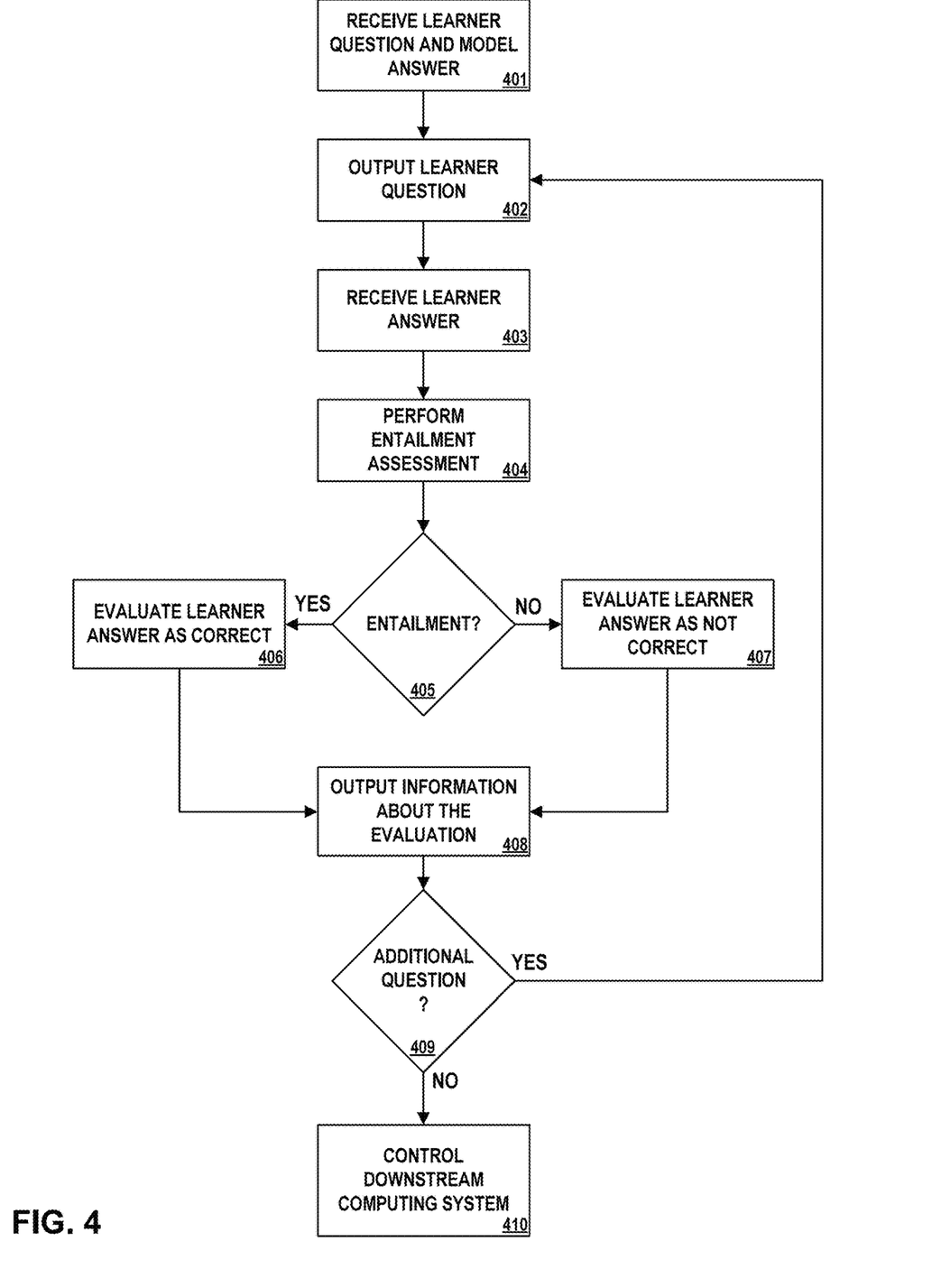
FIG. 4 is a flow diagram illustrating operations performed by an example computing system in accordance with one or more aspects of the present disclosure.

FIG. 4 is a flow diagram illustrating operations performed by an example computing system 170 in accordance with one or more aspects of the present disclosure. FIG. 4 is described herein within the context of computing system 170 of FIG. 1A. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, computing system 170 may receive a learner question and a model answer to the learner question (401). For example, with reference to FIG. 1A, learning system 130 of computing system 170 outputs prompt 111A to computing device 101, which is operated by instructional designer 102. Learning system 130 of computing system 170 receives a response to prompt 111A, based on input detected by computing device 101 (e.g., input from instructional designer 102). Learning system 130 determines that the response includes question 112A and model answer 113A.

Computing system 170 may output the learner question (402). For example, learning system 130 of computing system 170 in FIG. 1A outputs question 112A to computing device 103, which is operated by learner 104. Computing device 103 presents a user interface, prompting learner 104 to answer question 112A.

Computing system 170 may receive a learner answer (403). For example, computing device 103 of FIG. 1A detects input after prompting learner 104 with question 112A. Computing device 103 outputs information about the input to learning system 130. Learning system 130 determines that the information corresponds to learner answer 123A, representing an answer to question 112A from learner 104.

Computing system 170 may perform an entailment assessment (404). For example, learning system 130 outputs both model answer 113A and learner answer 123A to entailment model 136 in FIG. 1A. Entailment model 136 generates evaluation 125A based on the two answers. In some examples, evaluation 125A represents one of three possible responses: (1) positive, indicating the presence of entailment, (2) contradiction, indicating that the two answers are contradictory, or (3) neutral, indicating neither entailment nor contradiction, or possibly, no conclusion by entailment model 136.

Computing system 170 may evaluate the learner answer based on the assessment (405). For example, if entailment model 136 in FIG. 1A returns a value of "positive," learning system 130 concludes that learner answer 123A can be considered correct (406 and YES path from 405). If entailment model 136 does not return a value of "positive," learning system 130 concludes that learner answer 123A cannot be considered correct (407 and NO path from 405). In the specific example of FIG. 1A, learning system 130 determines that learner answer 123A is not considered correct.

Computing system 170 may output information about the evaluation (408). For example, learning system 130 in FIG. 1A generates feedback 129A for the purpose of informing learner 104 whether learner answer 123A is considered correct or incorrect. Learning system 130 outputs feedback 129A to computing device 103. Computing device 103 presents feedback 129A through a user interface, thereby presenting feedback 129A to learner 104.

Computing system 170 may perform a similar process for additional questions (409). For example, learning system 130 may be configured to present a series of questions 112 to learner 104. In such an example, learning system 130 may output, to computing device 103, each of questions 112 in the series, and wait for a corresponding learner answer 123 for each of the questions 112 (YES path from 409).

Computing system 170 may control a downstream computing system (410). For example, and with reference to FIG. 1A and FIG. 2, after outputting the series of questions 112 and evaluating corresponding learner answers 123, learning system 130 may output signals to one or more downstream systems 250 (see FIG. 2). In some examples, such downstream systems 250 may implement policy within an organization (e.g., educational policy). One or more downstream systems 250 may be configured to alter its operation or perform tasks based on information from computing system 170, where such information may, for example, pertain to knowledge levels on various subjects for the organization's members, workforce, or population. In at least this manner, computing system 170 may control one or more downstream systems 250.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices (e.g., computing device 101, computing device 103, computing system 270, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
receiving, by a computing system, a learner question and a model answer to the learner question;
outputting, by the computing system, the learner question;
responsive to outputting the learner question, receiving, by the computing system, a learner answer;
performing, by the computing system, an entailment assessment based on the model answer and the learner answer;
determining, by the computing system and based on the entailment assessment, an evaluation of the learner answer;
outputting, by the computing system, information about the evaluation; and
controlling, by the computing system, a downstream computing system based on the information about the evaluation, wherein controlling the downstream computing system includes outputting signals to the downstream computing system to cause the downstream computing system to perform operations based on the information about the evaluation.

2. The method of claim 1, wherein performing the entailment assessment includes:
applying a machine learning model trained to detect entailment between two sentences.

3. The method of claim 2, further comprising:
compiling, by the computing system, pairs of model answers and learner answers;
outputting, by the computing system, the pairs of model answers and learner answers to a refinement computing system;
enabling the refinement computing system to perform a ground truth assessment of each of the pairs of model answers and learner answers;
receiving, from the refinement computing system, information about the ground truth assessment of each of the pairs;
generating, by the computing system and based on the ground truth assessment of each of the pairs, new training data; and
retraining, by the computing system and based on the new training data, the machine learning model.

4. The method of claim 3, wherein enabling the refinement computing system to perform a ground truth assessment includes:
outputting, by the computing system, the pairs of model answers and learner answers to a panel computing device capable of being operated by a human judge;
receiving, from the panel computing device, an evaluation performed by the judge about whether each of the pairs of model answer and learner answers are semantically similar; and
generating, based on the evaluation, the new training data.

5. The method of claim 4,
wherein the panel computing device is included in a plurality of panel computing devices,
wherein the human judge is included in a panel of human judges, and
wherein each of the plurality of panel computing devices is operated by one of the human judges in the panel of human judges.

6. The method of claim 5,
wherein outputting the pairs of model answers and learner answers includes outputting the pairs of model answers and learner answers to each of the plurality of panel computing devices, and
wherein receiving an evaluation includes receiving, from each of the plurality of panel computing devices, an evaluation.

7. The method of claim 2,
wherein the machine learning model is initially trained based on a corpus of information comprising sentence pairs, where the sentence pairs are not based on questions and model answers designed by an instructional designer in an educational context.

8. The method of claim 1,
wherein the model answer and the learner answer each consist of a single sentence.

9. The method of claim 1, wherein outputting information about the evaluation includes:
outputting information about the evaluation to a computing device operated by a learner; and
enabling the computing device to present the information about the evaluation to the learner.

10. The method of claim 9, wherein enabling the computing device to present the information about the evaluation includes:
enabling the computing device to present information about the model answer to the learner.

11. The method of claim 1, wherein performing an entailment assessment includes:
determining a confidence score associated with the entailment assessment.

12. The method of claim 1, wherein controlling a downstream computing system includes:
controlling a downstream computing system that establishes educational policies within an organization.

13. The method of claim 12, wherein controlling a downstream computing system includes:
causing the downstream computing system to adjust educational initiatives within the organization.

14. A computing system comprising processing circuitry and a storage device, wherein the processing circuitry has access to the storage device and is configured to:
receive a learner question and a model answer to the learner question;
output the learner question;
responsive to outputting the learner question, receive a learner answer;
perform an entailment assessment based on the model answer and the learner answer;
determine, based on the entailment assessment, an evaluation of the learner answer;
output information about the evaluation; and
control a downstream computing system based on the information about the evaluation, wherein to control the downstream computing system, the processing circuitry is configured to output signals to the downstream computing system to cause the downstream computing system to perform operations based on the information about the evaluation.

15. The computing system of claim 14, wherein to perform the entailment assessment, the processing circuitry is further configured to:
apply a machine learning model trained to detect entailment between two sentences.

16. The computing system of claim 15, wherein the processing circuitry is further configured to:
compile pairs of model answers and learner answers;
output the pairs of model answers and learner answers to a refinement computing system;
enable the refinement computing system to perform a ground truth assessment of each of the pairs of model answers and learner answers;
receive, from the refinement computing system, information about the ground truth assessment of each of the pairs;
generate, based on the ground truth assessment of each of the pairs, new training data; and
retrain, based on the new training data, the machine learning model.

17. The computing system of claim 16, wherein to enable the refinement computing system to perform a ground truth assessment, the processing circuitry is further configured to:
output the pairs of model answers and learner answers to a panel computing device capable of being operated by a human judge;
receive, from the panel computing device, an evaluation performed by the judge about whether entailment is present between each of the pairs of model answer and learner answers; and
generate, based on the evaluation, the new training data.

18. The computing system of claim 17,
wherein the panel computing device is included in a plurality of panel computing devices,
wherein the human judge is included in a panel of human judges, and
wherein each of the plurality of panel computing devices is operated by one of the human judges in the panel of human judges.

19. The computing system of claim 18,
wherein outputting the pairs of model answers and learner answers includes outputting the pairs of model answers and learner answers to each of the plurality of panel computing devices, and
wherein receiving an evaluation includes receiving, from each of the plurality of panel computing devices, an evaluation.

20. Non-transitory computer-readable media comprising instructions that, when executed, configure processing circuitry of a computing system to:

receive a learner question and a model answer to the learner question;
output the learner question;
responsive to outputting the learner question, receive a learner answer;
perform an entailment assessment based on the model answer and the learner answer;
determine, based on the entailment assessment, an evaluation of the learner answer;
output information about the evaluation; and
control a downstream computing system based on the information about the evaluation, wherein the instructions that configure the processing circuitry to control the downstream computing system further include instructions that configure the processing circuitry to output signals to the downstream computing system to cause the downstream computing system to perform operations based on the information about the evaluation.

\* \* \* \* \*